May 7, 1929. J. J. McCABE 1,711,801
MACHINE FOR PRODUCING LENS GRINDING TOOLS
Filed Oct. 13, 1926 9 Sheets-Sheet 1
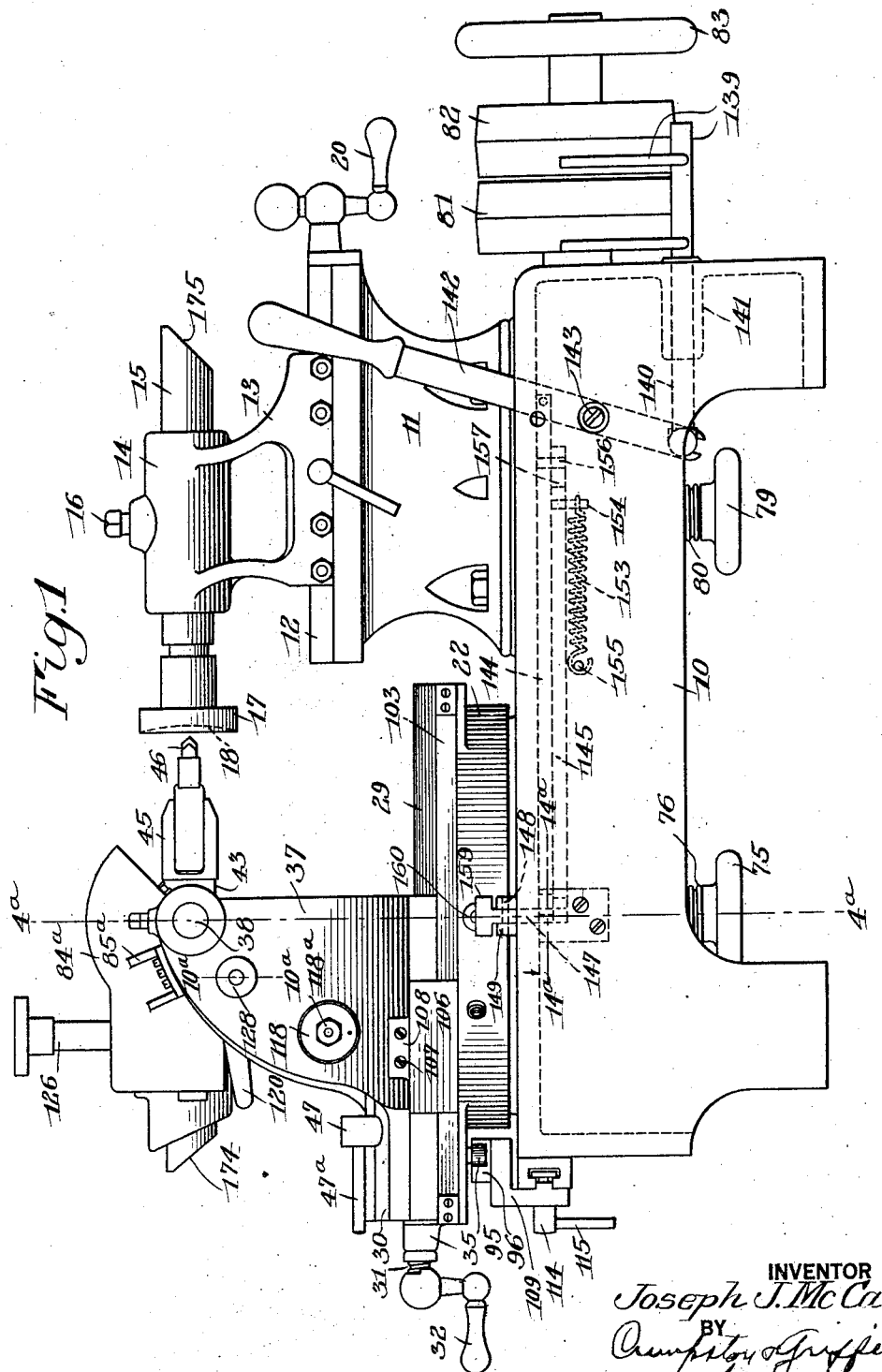
INVENTOR
Joseph J. McCabe
BY
Crumpton Griffith
his ATTORNEYS

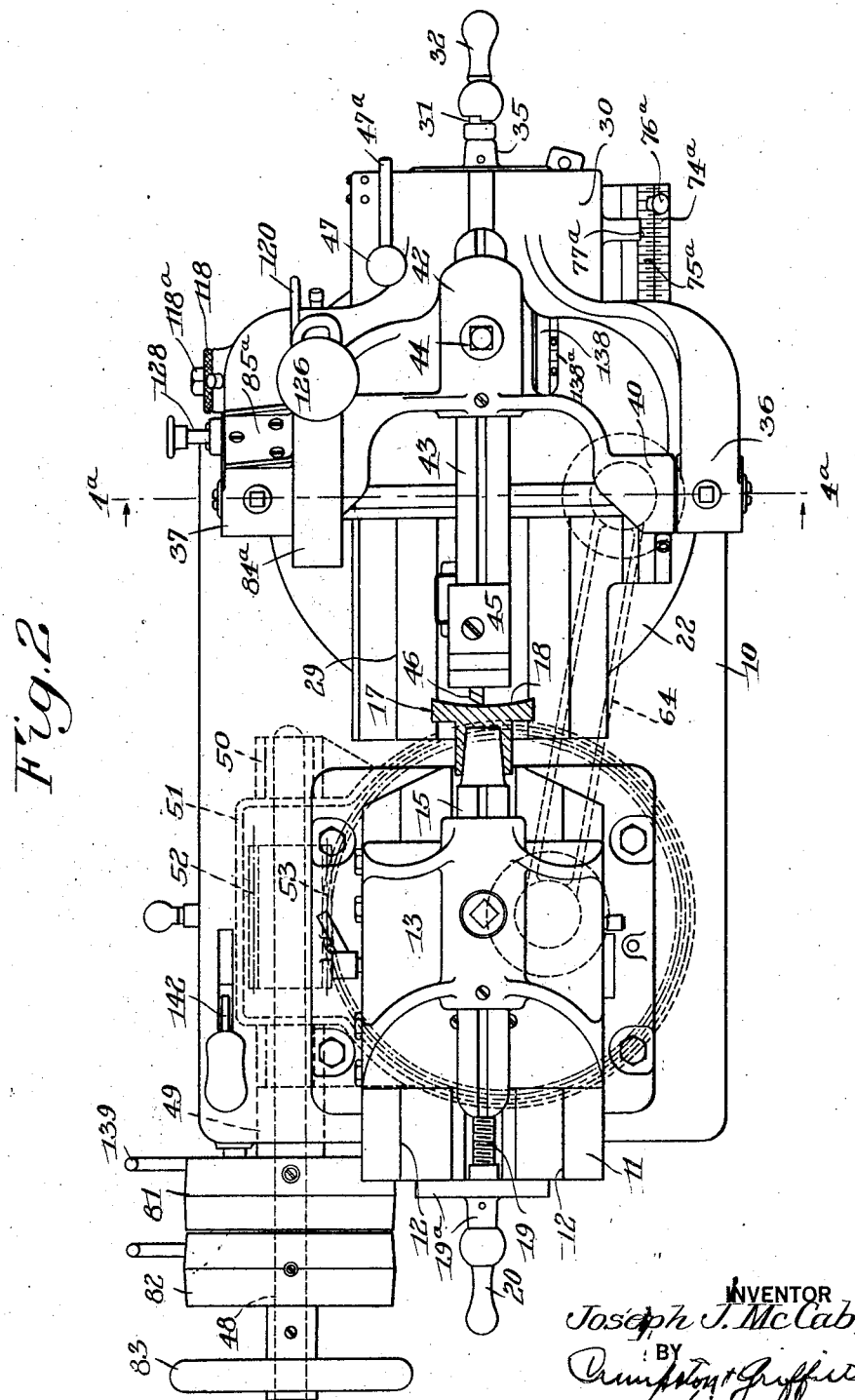

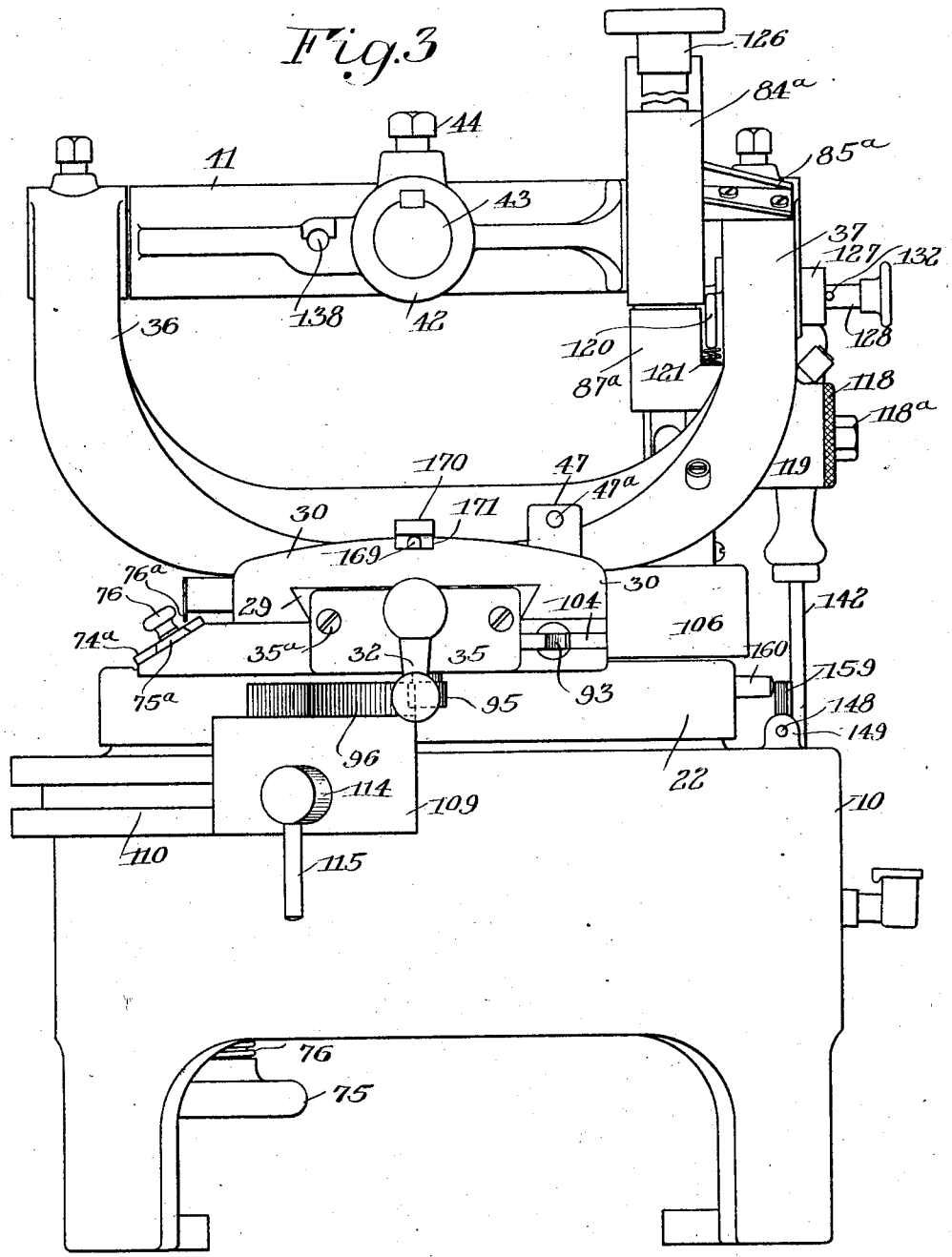

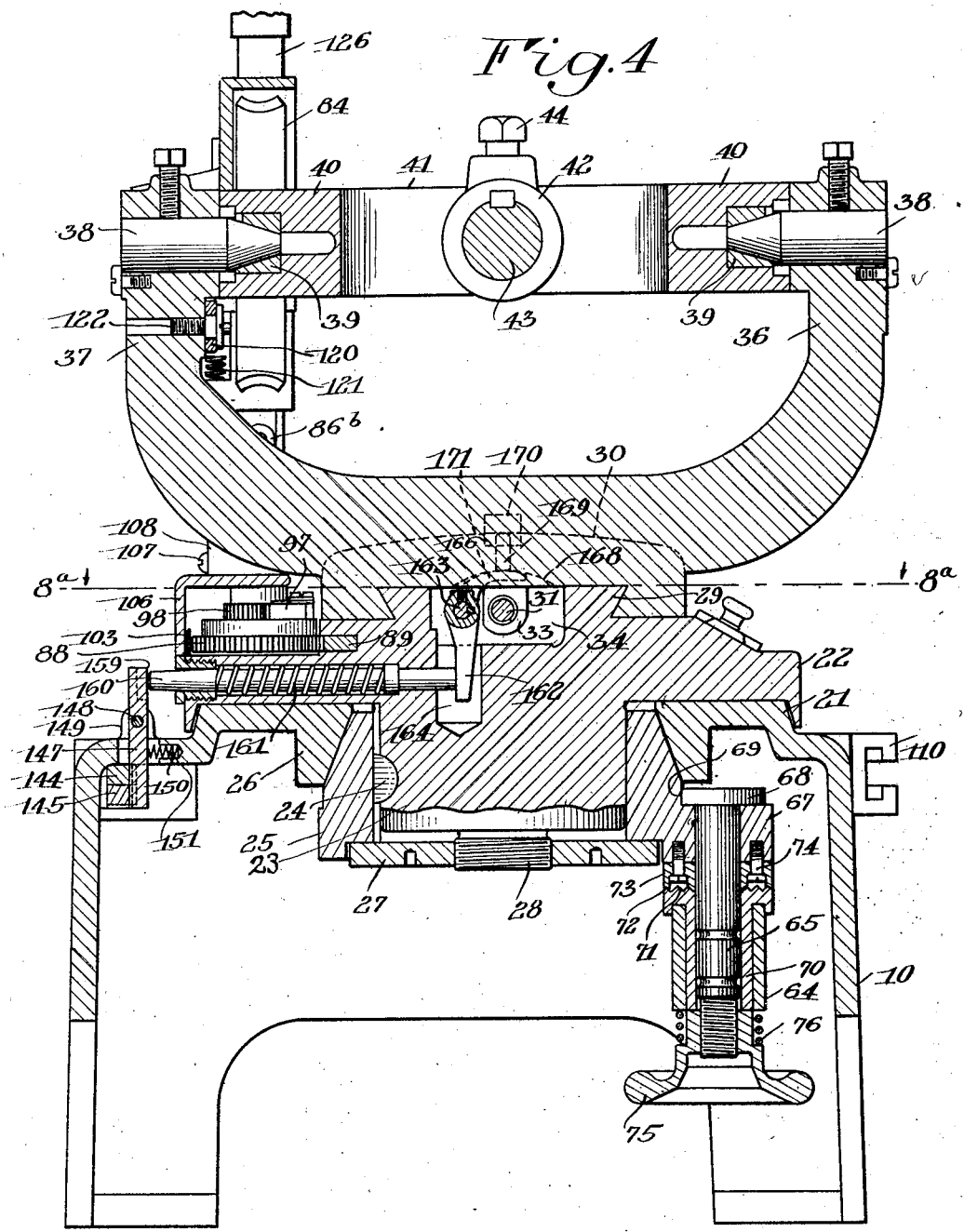

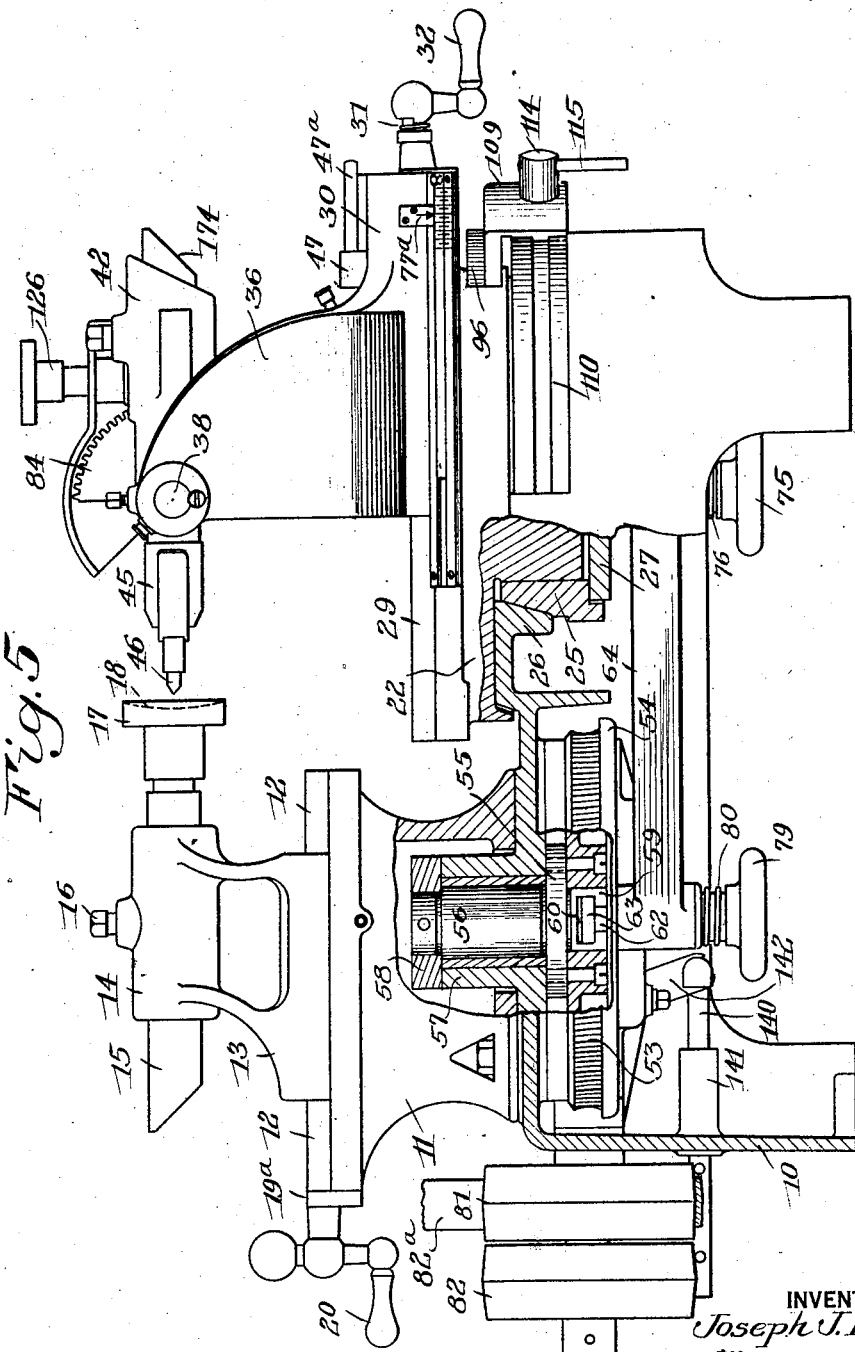

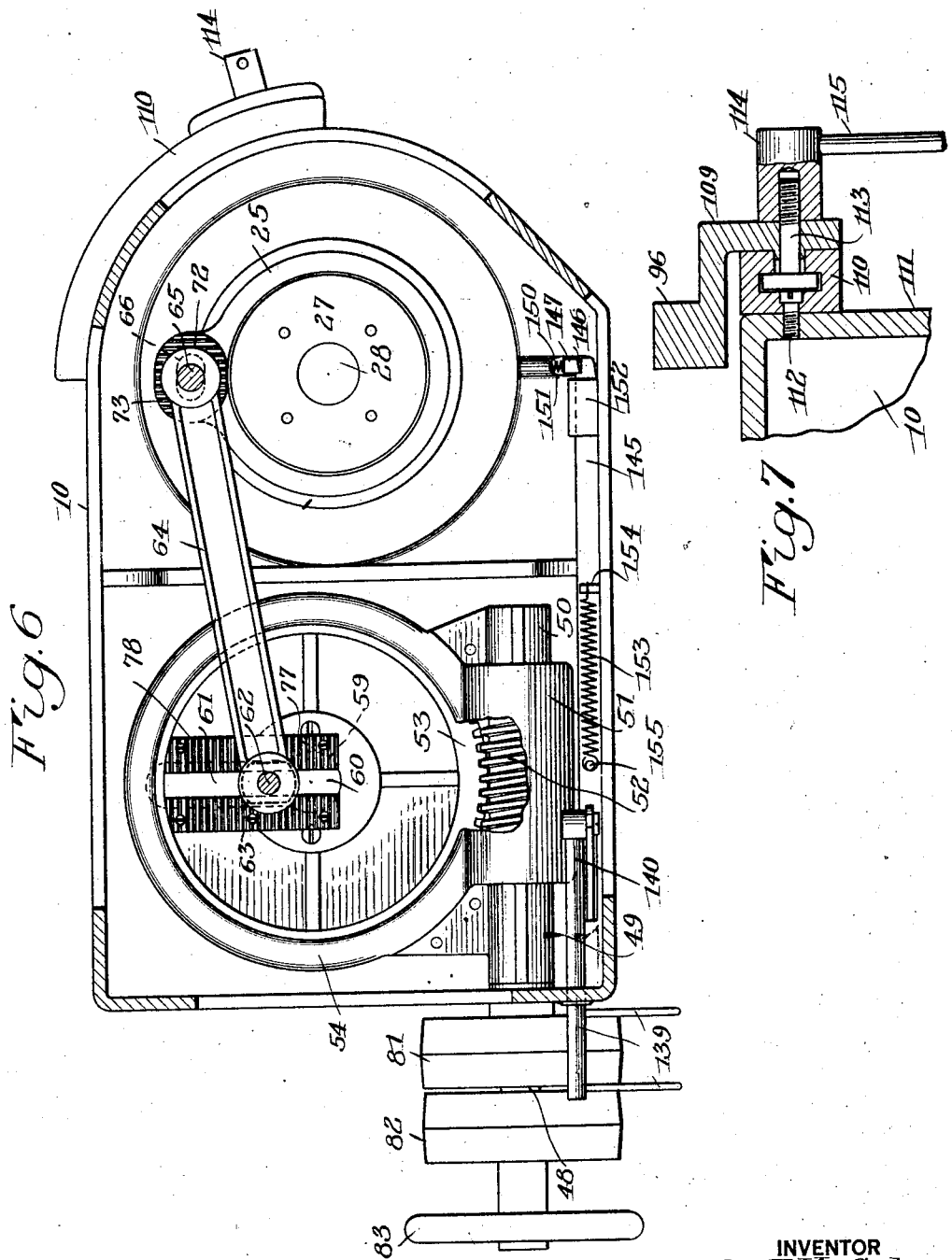

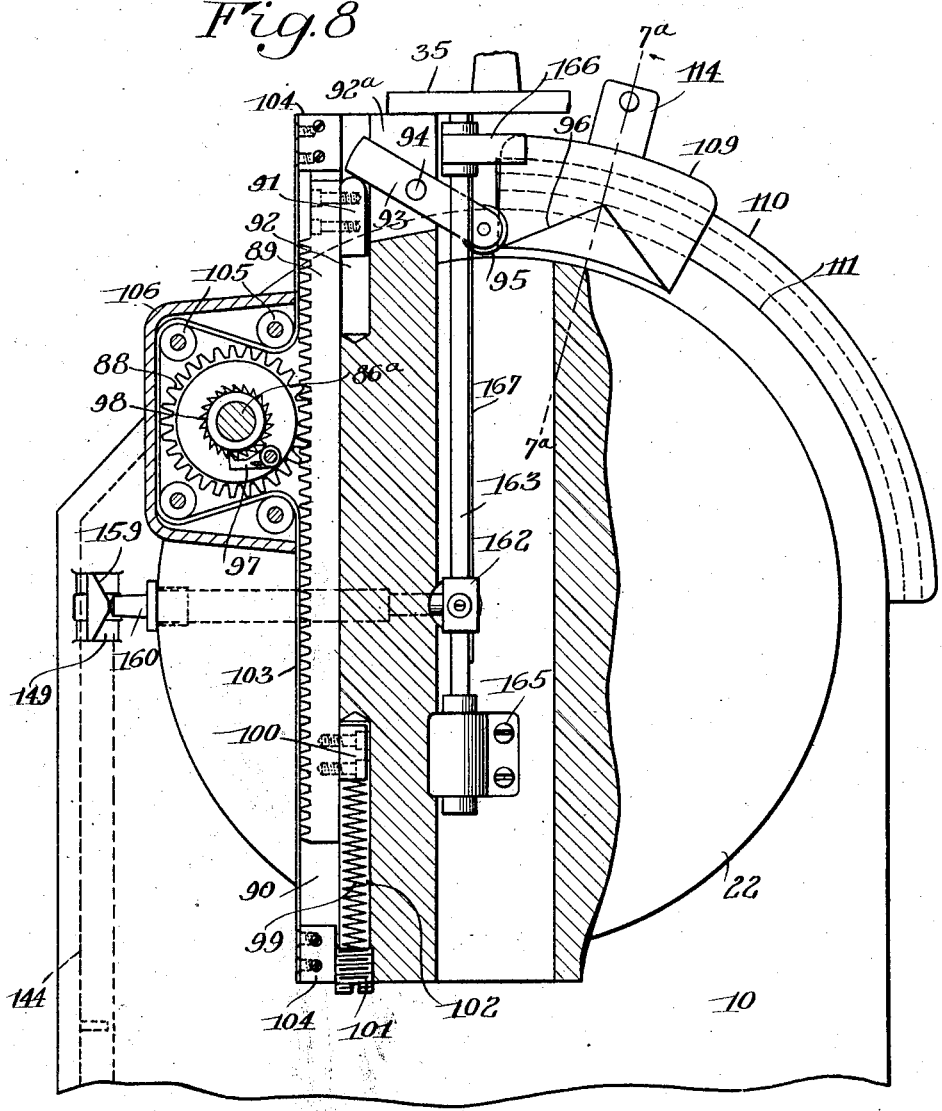
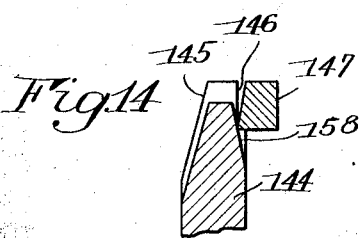

May 7, 1929.　　　J. J. McCABE　　　1,711,801
MACHINE FOR PRODUCING LENS GRINDING TOOLS
Filed Oct. 13, 1926　　　9 Sheets-Sheet 8
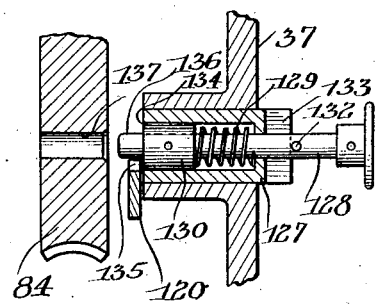
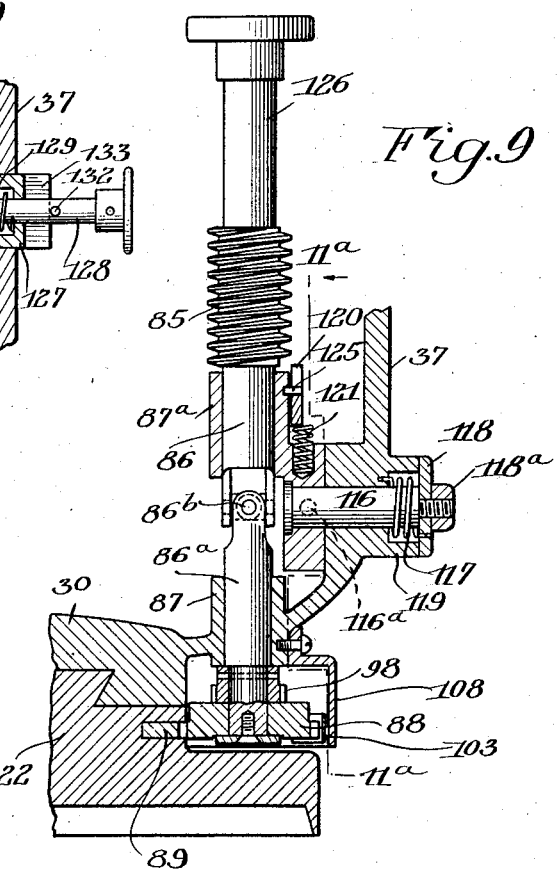
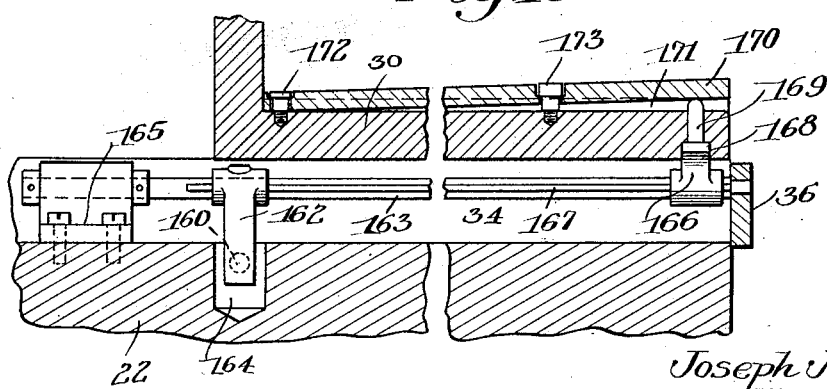
INVENTOR
Joseph J. McCabe
BY
his ATTORNEYS

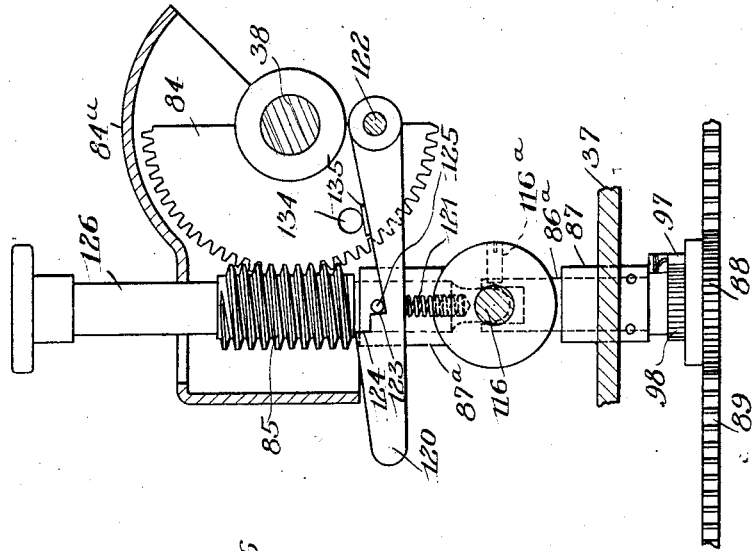
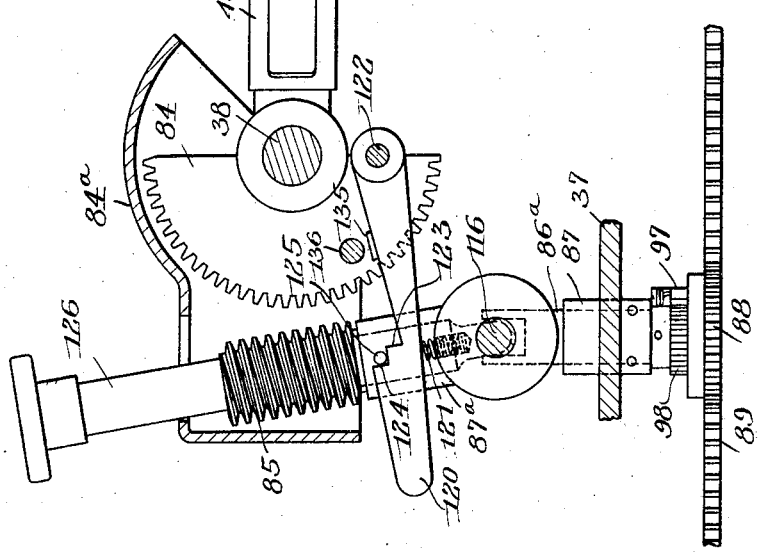

Patented May 7, 1929.

1,711,801

UNITED STATES PATENT OFFICE.

JOSEPH J. McCABE, OF ROCHESTER, NEW YORK, ASSIGNOR TO BAUSCH & LOMB OPTICAL COMPANY, OF ROCHESTER, NEW YORK, A CORPORATION OF NEW YORK.

MACHINE FOR PRODUCING LENS-GRINDING TOOLS.

Application filed October 13, 1926. Serial No. 141,410.

The present invention relates to a machine for forming tools and the like and is particularly adapted for forming or reforming lens grinding or lapping tools. One of the principal objects of the invention is to provide a machine of this character which is adapted to automatically and accurately perform the operations necessary to be carried out in producing the required curvature on the work and also to so construct and arrange the various parts of the several mechanisms as to provide a practical and convenient machine to operate, which is highly efficient in service and comparatively inexpensive to manufacture.

A further object of the invention is to provide a machine of the class described, with an improved automatic indexing mechanism for effecting relative movement between the work and tool at the end of each cutting operation or until the generating movements for producing the desired curvature have been completed.

A still further object of the invention is to provide improved means for automatically stopping the machine, subsequent to the completion of each work piece, in case the operator fails for any reason to disconnect the driving means by which the machine is operated.

To these and other ends the invention resides in certain improvements and combination of parts, all as will be hereinafter more fully described, the novel features being pointed out in the claims at the end of the specification.

In the drawings:

Figure 1 is a side elevation of a machine embodying one form of the invention;

Figure 2 is a top plan view of the same;

Figure 3 is an end elevation;

Figure 4 is a transverse section taken substantially on line $4^a$—$4^a$ of Figures 1 and 2;

Figure 5 is a side elevation looking at the opposite side of the machine from that shown in Figure 1 with certain parts shown in section to illustrate the operating means for the oscillatory work holder;

Figure 6 is a bottom plan of the machine with the legs thereof shown in section;

Figure 7 is a detail sectional elevation through the indexing cam and support therefor taken on line $7^a$—$7^a$ of Figure 8;

Figure 8 is a sectional plan illustrating a portion of the indexing mechanism;

Figure 9 is a vertical section illustrating the manner of mounting the indexing shaft and associated parts;

Figure 10 is a detail sectional elevation illustrating the means for supporting the tool carrying yoke and arbor in horizontal position taken on line $10^a$—$10^a$ of Figure 1;

Figure 11 is a sectional elevation taken on line $11^a$—$11^a$ of Figure 9 showing a portion of the indexing mechanism with the index worm shown in release position;

Figure 12 is a similar view with the worm shown in mesh with the indexing segment;

Figure 13 is a fragmentary sectional elevation illustrating a portion of the mechanism for automatically stopping the machine when the tool supporting arbor reaches a predetermined position; and Figure 14 is a sectional plan taken on line $14^a$—$14^a$ of Figure 1, showing the latching means for the trip lever which controls the belt shifter.

Similar reference numerals throughout the several views indicate the same parts.

The preferred embodiment of the invention disclosed herein by way of illustration, comprises a tool forming machine of the character indicated above, which is particularly adapted for forming or reforming the toric surfaces of lense grinding or lapping tools, referred to hereinafter as the work. The machine comprises, generally speaking, oppositely arranged adjustable holding members or arbors, one for holding the work and the other the forming tool, with means provided for producing relative movement between the adjacent ends of the members for producing curvature in two directions of the toric surface of the work. In the present machine, the forming tool has an oscillatory cutting movement in different planes about a vertical axis for generating curvature in one direction, and an alternate oscillation in a vertical plane about a horizontal axis for generating curvature in the other direction. The arbors are, however, interchangeably supported by the machine for performing both convex and concave surfaces.

The oscillatory tool carrying table or turret is power driven and serves to automatically operate an indexing mechanism, by which the tool is moved to a different plane following each cutting stroke, the turret being oscillated about a vertical axis and the tool, which is carried by the turret, being successively moved about a horizontal axis.

A trip mechanism is provided for either manually or automatically stopping operation of the machine subsequent to completion of a work piece, the same including a spring actuated belt shifter adapted to be released by a portion of the tool or work holder after movement of the same to a predetermined position by the indexing mechanism.

Referring to the drawings 10 represents a frame or base for the machine having at one end a tail stock comprising a bed or table 11 on the upper surface of which is provided a pair of spaced dove-tailed guides 12 upon which is movable a slide 13 having a bearing 14 for an arbor or work holder 15 adjustable longitudinally in the bearing toward and from the center of the machine, the same being held in adjusted position by a set screw 16. The inner end of the arbor is preferably tapered as shown in Figure 2 to receive the work or lens grinding tool 17 the curved surface 18 of which is formed in a manner subsequently described. The slide is adjustable upon the bed 11 by a feed screw 19 of a well known type having its outer end journaled in a bearing plate 19ª secured upon the outer ends of the guides 12 and operated by a handle 20 in a convenient manner.

At the opposite end of the machine from that carrying the work holding slide the frame is provided with an annular bearing plate 21, Figure 4, upon which is rotatably disposed a table or support 22 having a spindle 23 projecting downwardly through the bearing plate and keyed at 24 to a tapered bearing member 25 rotatably seated within a correspondingly tapered bearing 26 on the underside of the plate 21. The bearing member 25 is held upon its seat by a retaining plate 27 screwed upon a threaded extension 28 of the spindle 23. The support or turn table 22 is provided with oppositely disposed guides 29 on which is reciprocally mounted a tool holding slide 30 adapted to be moved back and forth upon the turn table by a feed screw 31 of a well known type having an operating handle 32 whereby the tool carrying slide may be moved toward and from the work when desired. The inner end of the feed screw 31 engages a lug 33 depending from the bottom of a slide in a recess 34 formed between the guides 29 of the turn table, as shown in Figure 4. The other end of the feed screw is journaled in a bearing plate 35 secured to the outer ends of the guide 29 by screws 35ª as shown in Figure 3.

The tool holding slide 30 carries a bearing yoke including a pair of upstanding arms 36 and 37, Figures 3 and 4, having bearings for a pair of trunnions 38 projecting into bearings 39 carried by the spaced ends 40 of a tool holding yoke 41 which is provided centrally with a sleeve or bearing 42 in which is slidably carried a tool bar or arbor 43 adapted to be held in different positions of adjustment by a set screw 44. The tool bar carries a suitable tool holding device such as a clapper box 45 in which is pivotally secured a suitable tool 46 for producing the desired cuts on the work 17 carried by the arbor 15. The slide 30 may be secured in the desired position of adjustment upon the table 22 by a well known form of clamping device 47 operated by a handle 47ª, in the usual manner.

The means for oscillating the table to move the tool in engagement with the work during the cutting operations comprises a power driven shaft 48 journaled in bearings 49 and 50 on a worm casing 51 suitably secured to the bottom surface of the upper wall of the base 10. The shaft 48 is provided in the casing with a worm 52 meshing with a worm wheel 53 having a ring shaped guard 54 preferably formed integral with the casing 51 as shown in Figure 6. The worm wheel is suitably bolted to the head 55 of a spindle 56 rotatable in a bearing 57 formed upon the base 10, the spindle being supported by a collar 58 resting on and free to rotate upon the upper end of the bearing 57 as shown in Figure 5. The head 55 of the spindle carries a depending circular extension 59 which fits snugly within a central opening of the worm wheel, said extension having a T-slot 60 aligned with a similarly shaped slot 61 formed in the bottom of the worm wheel as indicated in Figure 6. A bolt 62 is dependingly carried by the worm wheel having its head 63 slidably disposed in the T-slot 61 thereof, the head being also adjustable in the slot 60 of the spindle extension 59, which as previously stated is aligned with the slot 61. A connecting rod 64 is provided for oscillating the turn table 22 to effect a back and forth movement of the tool, one end of the rod being carried by the bolt 62 and the other by a somewhat similar bolt 65. The bolt 65 projects downwardly through an elongated slot 66 in a crank arm 67 on the swivel bearing member 25, Figures 4 and 6. The bolt is prevented from turning by having its head 68 cut away at one side to form a flat portion adapted to engage a shoulder 69 on the bearing member 25. The bolt 65 projects through a sleeve 70 journaled in the connecting rod 64 as shown in Figure 4. The upper end of the sleeve 70 is provided with a series of teeth 71 adapted to engage with similar teeth 72 on a plate 73 secured to the underside of the arm 67 by screws 74. The lower end of the bolt 65 is threaded to receive a nut 75 including a hand wheel by which to conveniently tighten the nut so as to clamp the sleeve 70 upon the toothed plate 73 whereby the parts are rigidly held in the desired position of adjustment.

A spring 76 surrounding the nut tends to prevent loosening of the same during operation of the machine, by increasing friction between the threads thereof and those of the bolt.

The opposite end of the connecting rod, through which the bolt 62 projects, carries a sleeve (not shown) similar to the sleeve 70 which is provided with a series of teeth at its upper end adapted to engage correspondingly shaped teeth 77 of a pair of plates 78 secured to the bottom of the worm wheel 53 on opposite sides of the slots 60 and 61. The bolt 62 also carries a nut 79 similar to the nut 75, Figure 1, which is prevented from working loose by a spring 80 corresponding to the spring 76 of the bolt 65. The bolt 62 may be adjusted in the slots 60 and 61 toward or from the axis of the worm wheel to vary the throw of the turn table and likewise that of the tool whereby to accommodate the machine to work pieces of various sizes. In making such an adjustment the nuts 75 and 79 are both loosened, at which time the bolt 65 is free to slide in the slots 66 of the arm 67 to take care of the slight longitudinal movement of the connecting rod in shifting its opposite end toward or from the center of the worm wheel 53. For every revolution of the worm wheel the tool will move across the face of the work and back to its original starting point, ready for the next succeeding cut.

The shaft 48 may be operated by any suitable power means, but is preferably provided with fixed and loose pulleys 81 and 82 respectively, the former being adapted to be driven by a belt 82ª. The shaft is also provided with a hand wheel 83 for turning it under certain conditions of operation as will appear hereinafter.

The indexing mechanism by which the tool is shifted to a different plane for each cutting stroke includes a worm wheel segment 84 suitably connected with one end 40 of the tool supporting yoke 41 adjacent the arm 37 of the yoke extending upwardly from the slide 30. The worm wheel segment is adapted to mesh with a worm 85 on a flexible shaft including upper and lower sections 86 and 86ª having a universal connection 86ᵇ. The segment 84 and worm 85 are provided with a housing 84ª supported by a bracket 85ª secured to the arm 37 as shown in Figures 2 and 3. The lower section of the shaft is journaled in a bearing 87 while the upper section is carried by a swiveled bearing 87ª. The lower section carries a gear 88 loosely mounted thereon and meshing with a rack 89 slidably disposed in a recess 90 formed in one side of the support or turn table 22. The outer end of the rack is provided with a lug 91 which is preferably bolted thereto and which operates in a recess 92 formed in the slide. The rack is actuated by a lever 93 in a recess 92ª of the turn table 22, the lever being pivoted at 94 and having its outer end resting upon the lug 91 of the rack while its opposite end carries a roller 95 adapted, as the turn table is moved clockwise from the position shown in Figure 8 to travel upon a cam 96 which causes the lever to move the rack in a direction toward the center of the machine thus rotating the gear 88. The gear carries a pawl 97 which engages and operates a ratchet wheel 98 rigid on the lower section 86ª of the indexing shaft. The indexing worm 85 is thus advanced step by step to shift the position of the yoke and the tool thereon for each swing of the turn table in one direction by the connecting rod 64.

A spring 99 serves to automatically return the rack from the position to which it is advanced by the lever 93 when the turn table is swung in an opposite direction from that in which it is moved during the cutting stroke of the tool. The spring is interposed between a lug 100 of the rack and a screw plug 101, threaded into the end of a recess 102 in which the spring is disposed, the recess being formed at the inner end of the turn table 22 in the front side thereof. The rack is protected by a flexible band 103 formed of steel or other suitable material and having its ends secured to blocks 104 which serve to close the ends of the slot or recess 90 in which the rack travels. The band upon movement of the slide 30 on the turn table, is adapted to travel upon a series of rollers 105 carried by a housing 106 for the gear 88 and ratchet wheel 98, the housing being secured to the base of the arm 37 by screws 107 extending through a lug 108 on the housing into the arm. The housing and the rollers carried thereby thus travel with the slide and consequently move relative to the turn table and rack thereon when the slide is advanced or retracted. The housing serves the double purpose of protecting the indexing gear and ratchet wheel and supporting the rollers, which permit the band to be carried around the gear as indicated in Figure 8.

The cam 96 for operating the rack actuating lever 93 is carried by a block or bracket 109 adjustable upon a segment 110 secured to the circular portion 111 of the base 10 and connected thereto by screws 112, Figure 7. The segment is slotted to receive the head of a retaining bolt 113 for the bracket 109, the bolt being extended through the bracket into a nut 114 having a handle 115 by which the nut is turned to clamp the bracket in the desired position of adjustment upon the segment.

The extent of movement of the indexing shaft may be varied as desired by adjusting the cam 96 so that the roller 95 will travel the desired distance thereon whereby to vary the stroke of the rack and consequently the distance between the cutting planes of the tool 46, it being understood that the cam is positioned to engage the roller during movement of the turn table between the cutting periods of the tool.

The swivel bearing 87ª for the indexing shaft section 86 is pivotally supported by a pin 116 rotatably mounted in the lower portion of the arm 37, Figure 9, which carries one end of the tool supporting yoke 41. The pin 116 is fixed to the bearing member 87ª so as to rotate therewith, preferably by a set screw 116ª. A torsion spring 117 is coiled about the outer end of the pin and has one end anchored upon the arm 37 and the other upon a plate 118 rigidly clamped upon the pin by a nut 118ª and having a bearing upon an annular boss 119 on the arm 37. The spring tends to move the swivel bearing and the worm 85 from operative to inoperative position as shown in Figure 11, but is normally prevented from doing so by a hand control latch or lever 120 when the later is in the position shown in Figure 12, the latch being held in this position by a spring 121 seated in a recess formed in the swivel bearing. The latch 120 is pivotally supported by a pin 122 carried by the arm 37 of the slide 30 as shown in Figure 4. The latch is provided with two shoulders 123 and 124, the former of which engages a pin 125 on the bearing 87ª when the worm 85 is in mesh with the segment 84, and the latter of which engages the pin when the worm is moved to a released position as shown in Figure 11. The spring 121 serves to hold the latch pressed against the pin either in the latching position shown in Figure 12, or the release position shown in Figure 11. The upper section 86 of the indexing shaft is provided with an extension 126 forming a handle by which the operator may conveniently move the worm 85 into and out of engagement with the segment 84 when it is desired to release or set the indexing mechanism from time to time.

Means is provided for holding the yoke 41 in a horizontal position during the time the tool is being adjusted with respect to the work and before the cutting operations are begun. This means comprises a sleeve or bushing 127 extending through and secured within the arm 37 and having a locking bolt 128 slidable in the bushing, Figure 10. A spring 129 surrounds the bolt within the bushing and has one end seated on an enlarged portion 130 of the bolt and the opposite end upon the outer end portion 131 of the bushing. The bolt is provided with a transversely extending pin 132 which normally engages the outer end of the bushing to hold the bolt in released position. The bushing has a slot 133 for receiving the pin when it is desired to set the bolt in position to support the tool holding yoke in horizontal position as stated above. The portion 130 of the bolt is provided with a shoulder 134 adapted when the latch 120 is in locking position with respect to the indexing worm 85, Figure 12, to engage a projection 135 on the latch whereby the bolt is prevented from moving inwardly. At the completion of each work piece the operator will move the latch 120 to release position, Figure 11, and by holding the tool carrying yoke in one hand and bringing it to horizontal position, the other hand may be used to position the bolt so that the spring 129 will move it inwardly and allow the reduced end 136 of the bolt to enter an opening 137 in the indexing segment 84, whereby the yoke is held in horizontal position to permit proper adjustment of the tool arbor longitudinally of its bearing sleeve or transversely of the axis of the yoke to vary the radial distance of the tool from said axis according to the curvature of the work surface in one direction. The adjustment is made by the use of suitable gauge means, not shown, including a gauge bar slidable in a groove or slot 138 formed in the yoke 41, the bar cooperating with an index plate 138ª and being preferably of the type shown and described in Patent No. 1,513,883 issued to Carl L. Bausch, November 4, 1924.

One of the important features of the present invention is the provision of means for automatically discontinuing operation of the machine under certain conditions, as for instance in cases where the operator may leave the machine for one cause or another without remembering or taking time to disconnect the driving means. In such cases continued operation of the indexing mechanism would cause the outer end of the arbor or tool bar 43 to move downwardly into engagement with the slide 30 and should the machine not be stopped before this time breakage of certain of the parts will occur, following further advancement or continued operation of the indexing mechanism. The means for automatically stopping the machine under such circumstances comprises mechanism for automatically shifting the belt, 82ª, from the tight to the loose pulley. For this purpose the belt shifter 139, which is of a well known type, includes a rod 140 slidable in a bearing 141 of the base 10, Figure 1, the inner end of the rod being pivotally connected to the lower end of a lever 142 which is pivoted to the base at 143. The lever is pivotally connected above the pivot 143 to a release rod 144 extending longitudinally of the base and resting upon a latch bar 145 which is notched at its inner end as indicated at 146, Figure 14, to receive the lower end of a trip lever 147 pivoted at 148 between a pair of upstanding lugs 149 on the base at a point opposite the center of the turn table 22. The lower end of the trip lever is normally pressed outwardly, to engage the notched end 146 of the latch bar by a spring 150 in a pocket 151 formed in the base, Figure 6. The inner ends of the rod 144 and bar 145 are supported by and slidable in a bracket or bearing 152 suitably secured to the base. The bar 145 is held in latching position by a spring 153 having one end connected with a pin 154 depending from the bar and the other end with a pin 155 secured to the base. The rod 144 carries a depending pin 156 operable in a slot 157 in the latch bar 145 to permit a certain amount of movement of the rod by the lever 142 without movement of the latch bar. This movement is utilized to effect release of the trip lever 147 by the operator whenever he desires to stop the machine. In this operation a cam 158 on the inner end of the rod 144 acts, when the rod is moved by the hand lever 142, to move the lower end of the trip lever out of the notch 146, thus permitting the spring 153 to move the latch bar to the left as viewed in Figure 1. The bar in turn, through engagement with the pin 156 of the release rod will move the latter to the left and swing the hand lever upon its pivot whereby its lower end is moved to the right to cause the belt shifter to move the belt from the tight to the loose pulley. The same operation takes place when the machine is stopped by the automatic trip mechanism for releasing the trip lever 147 which will now be described.

The upper end of the trip lever is provided with a cam or inclined surface 159 upon which is adapted to ride, under certain conditions of operation, the outer end of a spring-pressed plunger 160 slidable in the turn table 22, Figure 4, and normally held retracted by a spring 161. The inner end of the plunger engages the lower end of an arm 162 projecting downwardly from a rock shaft 163 into a pocket 164 formed in the turn table. The rock shaft extends longitudinally within the recess 34 of the turn table and has its outer end journaled in the end plate 35 carrying one end of the feed screw 31 for advancing the slide 30. The opposite end of the shaft is journaled in a bracket 165 carried by the turn table within the recess 34 thereof. The outer end of the shaft carries an upstanding arm 166 which is free to slide upon the shaft but which is prevented from turning thereon by a key 167 extending substantially the full length of the shaft. The upper end of the arm 166 extends toward the center of the turn table and projects into a recess 168 formed in the slide 30, Figure 13, so that movement of the slide in either direction will cause the arm to travel therewith, due to the fact that it is slidably disposed upon the rock shaft. The upper end of the arm is held within the recess 168 by the action of the spring-pressed plunger 160 in engagement with the lower end of the depending arm 162. A pin 169 projects upwardly through the outer end of the slide 30, said pin having its lower end resting upon the arm 166 and its opposite end engaging the bottom of an operating bar 170 disposed in a slot 171 formed in the upper face of the slide 30 at the center thereof. The bar is loosely held at its inner end by a headed pin 172 and is limited in its upward movement by another pin 173 secured to the slide 30 as indicated in Figure 13.

Automatic shifting of the belt from the tight to the loose pulley will be effected by the mechanism just described when as stated above the operator for any reason fails to stop the machine after completion of the cutting operations on a given piece of work, since under such circumstances the beveled end 174 of the tool bar 43 or the similarly shaped end 175 of the work holder 15 will move downwardly and depress the operating bar 170. The latter will in turn depress the pin 169 to swing the upper end of the arm 166 downwardly whereby the shaft 163 is rocked and the depending arm 162 thereon will then force the plunger 160 outwardly so that when the turn table swings the plunger into engagement with the cam surface 159 of the trip lever the lower end of the latter will be thrown inwardly to release the latch bar 145. At this time the spring 153 will move said bar and the release rod 144 to shift the hand lever 142 as described above, said lever then serving to move the belt shifter 139 to the right from the position shown in Figure 1.

The drive shaft 48 for rotating the worm 52 to drive the worm gear 53 may be manually operated by turning the hand wheel 83 when it is desired to shift the tool to regulate its position with respect to the work before starting the cutting operations on a given piece of work.

The curvature of the work surface produced by movement of the tool in the horizontal direction about the vertical axis of the turn table is of course determined by the distance of the tool from said axis, it being apparent however that the adjustment of the tool relative to the horizontal axis of the tool-holding yoke must be taken into account in adjusting the turret slide 30 relative to the axis of the turret or turn table 22. In other words the settings relative to the two axes must be correlated.

Means is provided for properly determining the position of the tool with respect to the work. This means is similar to that shown and described in the above mentioned patent and comprises fixed and adjustable scale bars 74$^a$ and 75$^a$ on the turn table, the last mentioned bar being clamped in position by a screw 76$^a$. The slide 30 carries an index 77$^a$ for cooperation with the scale 75$^a$. The scales are marked off in diopters the same as in the patent referred to above, and the manner of employing the scales to make the necessary adjustments is the same as described in said patent and need not be further described herein as it forms no part of the present invention.

It will be understood that if it is desired to form a convex work surface the work and tool arbors or holders can be readily interchanged from the positions shown in the drawings to accomplish this result, as stated above.

In the operation of the machine the tool arbor is adjusted in either of the bearings 14 or 42 in which it may be placed, to locate the point of the tool at the proper distance from the axes of swinging movement for producing the respective curvatures desired. The work holding arbor is carried by the opposite bearing and adjusted for the proper depth of cut. After these adjustments have been made, with the aid of the gauge mechanisms referred to above and the tool supporting arbor inclined at its proper angle, the indexing worm is moved into engagement with the segment 84 and latched and the hand lever 142 shifted to move the belt from the loose to the tight pulley to start operation of the machine. Rotation of the worm wheel 53 will then operate the connecting rod to effect oscillation of the turn table, which as shown, carries the tool. Movement of the turn table in one direction about its vertical axis causes a relative cutting movement between the work and the tool and while the table is being rotated in the opposite direction the roller 95 of the lever 93 will ride upon the cam 96 thus effecting movement of the rack 89 toward the center of the machine which advances the gear 88 and ratchet wheel whereby the indexing shaft and the worm 85 are actuated to shift the tool-holding yoke and the tool thereon the desired amount.

These operations are continued automatically until the work is completed, after which the operator stops the machine by moving the lever 142 to shift the belt from the tight to the loose pulley. The latch 120 is then released to permit the spring 117 to move the worm 95 of the indexing shaft out of engagement with the segment 84.

The present machine is adapted to cut a smooth and accurate toric surface upon the work, having the component curvatures desired, by providing the correct distances between the work or point of the tool and the vertical and horizontal axes of the turn table 92 and yoke 41 respectively.

It will be apparent from the above description and from the drawings that the machine is simple and rugged in construction, convenient to adjust, and accurate in operation. The machine is also capable of producing wide variations in curvature, either convex or concave, and due to convenience in adjustment and operation accomplishes the work in a rapid manner.

While the machine is designed primarily for producing lens lapping or grinding tools, it will be understood that it can be readily employed for other purposes, where it is desired to produce different parts designed to have curved surfaces of the character described above.

I claim as my invention:

1. In a machine of the class described, the combination of a frame, a table mounted for oscillation thereon, a pair of cooperating holding members, one of which is pivoted upon the table, cooperating means upon the frame and table for moving said pivoted holding member relative to the table, a tool carried by one of said holding members for cooperation with a work piece carried by the other, a member revolubly mounted upon the frame, means for driving said member, and an operating connection between said revoluble member and said table adapted to oscillate the latter.

2. In a machine of the class described, the combination of a frame, an oscillatory support thereon, a pair of cooperating holding members, one of which is mounted upon the support to move relative thereto, operating means for oscillating the support, cooperating means carried by the frame and support adapted upon movement of the support in one direction to shift the holding member thereon, a tool carried by one of said holding members for cooperation with a work piece carried by the other, and means controlled by one of said holding members adapted when the latter is advanced to a predetermined point to render said operating means inoperative.

3. In a machine of the class described, the combination of a frame, a pair of cooperating holding members, a pivotal support for one of said members, the latter being mounted for a swinging movement upon said support, an indexing mechanism carried by the pivotal support for actuating the last mentioned holding member, means carried by the frame for actuating said indexing mechanism, a tool carried by one of said holding members for cooperation with a work piece carried by the other, a gear revolubly mounted upon the frame, driving means for the gear, an operating connection between the gear and pivotal support adapted to oscillate the latter, and means controlled by one of said holding members adapted to discontinue operation of the driving means when said holding member is advanced to a predetermined position.

4. In a machine of the class described, the combination of a frame, a pair of cooperating holding members, an oscillatory support for one of said members, the last mentioned member being mounted for a swinging movement upon said support, an indexing mechanism for said last mentioned holding member, mounted upon said support, a tool carried by one of said holding members arranged for cooperation with a work piece carried by the other holding member, power driven means for oscillating said support and means controlled by one of said holding members adapted to discontinue operation of said power driven means when said holding member is advanced to a predetermined position.

5. In a machine of the class described, the combination of a frame, a pair of cooperating holding members, an oscillatory support for one of said members, the last mentioned member being mounted for a swinging movement upon said support about an axis transverse to the axis of the support, a cam upon the frame, an indexing mechanism for the last mentioned holding member, mounted upon the support and adapted to be operated by the cam upon movement of the support in one direction, a tool carried by one of said holding members adapted for cooperation with a work piece carried by the other holding member, and means for oscillating said support.

6. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means carried by said table adapted to operate the first mentioned holding member, means upon the frame adapted to effect operation of the indexing mechanism when the table is moved to a predetermined position, and means for actuating the table.

7. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means, including relatively movable parts carried by said table and slide adapted to operate the first mentioned holding member, means upon the frame adapted to effect operation of one of said parts when the table is moved to a predetermined position and means for oscillating the table.

8. In a machine of the class described, the combination of a frame, a table journaled thereon, a pivotally mounted holding member carried by the table adapted to swing about an axis transverse to the axis of the table, a second holding member carried by the frame, a tool carried by one of said holding members for cooperation with a work piece carried by the other holding member, indexing means carried by said table adapted to operate the first mentioned holding member, means upon the frame adapted to effect operation of the indexing mechanism when the table is moved to a predetermined position, a gear mounted upon the frame, driving means for the gear, and an operating rod for oscillating the table having one end pivotally connected thereto and the other end adjustably connected with the gear for movement toward and from the center thereof whereby to vary the throw of the table.

9. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means including relatively movable parts, carried by said table and slide adapted to operate the first mentioned holding member, means upon the frame adapted to effect operation of one of said parts when the table is moved to a predetermined position, and means for oscillating the table.

10. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means carried by said table including cooperating parts adapted to operate the first mentioned holding member, means upon the frame adapted to effect operation of one of said parts when the table is moved to a predetermined position, a gear mounted upon the frame, driving means for the gear, a bearing member journaled upon the frame and operatively connected with the table, a crank-pin upon the bearing member and a connecting rod having one end journaled upon the pin and the other pivotally connected with the gear in spaced relation to the axis thereof.

11. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means carried by said table and slide adapted to operate the first mentioned holding member, means upon the frame adapted to effect operation of the indexing mechanism when the table is moved to a predetermined position, a gear mounted upon the frame, driving means for the gear, pivot-pins adjustably carried by said gear and table, a connecting rod between the gear and table having its opposite ends supported by the pins and means for clamping each pin in adjusted position.

12. In a machine of the class described, the combination of a frame, a table journaled thereon, a slide upon the table, a holding member pivoted upon the slide to swing about an axis transverse to the axis of the table, a second holding member carried by the frame, a tool carried by one of said holding members for cooperation with a work piece carried by the other holding member, indexing means carried by said table and slide adapted to operate the first mentioned holding member, means upon the frame adapted to effect operation of the indexing mechanism when the table is moved to a predetermined position, a pair of actuating members for the table, an operating rod between said members, pivot pins for supporting the rod adjustably connected with said members, a sleeve carried by one of the pins and forming a bearing for one end of the rod, said sleeve and the actuating member to which its pin is connected having interengaging teeth cooperating to resist displacement of the sleeve, and a nut upon the last mentioned pin for clamping the sleeve upon said actuating member.

13. In a machine of the class described, the combination of a frame, a pivotal support thereon, a pair of cooperating tool and work holding members, one of which, is fixed upon the frame and the other mounted for a swinging movement upon the support, means for oscillating the support upon its axis, indexing means carried by the support including a shaft operatively associated with said swingingly mounted holding member, a rack and pinion adapted to advance the shaft step by step, a lever upon the support for moving the rack, and a cam upon the frame for actuating the lever when the support is moved to a predetermined position.

14. In a machine of the class described, the combination of a frame, an oscillatory support thereon, a pair of cooperating holding members, one of which is pivoted to swing upon the support, cooperating means upon the frame and support adapted upon movement of the latter to move said pivoted holding member relative to the support, said means including a gear segment and a releasable driving worm for the same, a tool carried by one of said holding members for cooperation with a work piece carried by the other, means for actuating said pivotal support.

15. In a machine of the class described, the combination of a frame, a table mounted for oscillation thereon, a pair of cooperating holding members, one of which is pivoted to swing upon the table, cooperating means upon the frame and table for moving said pivoted holding member relative to the table, said means including a worm drive and pawl and ratchet mechanism for operating the same, a tool carried by one of said holding members for cooperation with a work piece carried by the other, a member revolubly mounted upon the frame, means for driving said member, and an operating connection between said revoluble member and said table adapted to oscillate the latter.

16. In a machine of the class described, the combination of a frame, an oscillatory support thereon, a pair of cooperating holding members, one of which is mounted upon the support to move relative thereto, operating means for oscillating the support, cooperating means carried by the frame and support adapted upon movement of the support in one direction to shift the holding member thereon, said means including a shaft having a worm thereon and a rack and pinion for operating the same, and a tool carried by one of said holding members for cooperation with a work piece carried by the other.

17. In a machine of the class described, the combination of a frame, an oscillatory support thereon, a pair of cooperating holding members, one of which is mounted upon the support to move relative thereto, actuating means for oscillating the support, cooperating means carried by the frame and support adapted upon movement of the support in one direction to shift the holding member thereon, a tool carried by one of said holding members for cooperation with a work piece carried by the other, and means controlled by one of said holding members adapted when the latter is advanced to a predetermined point to render said actuating means inoperative.

18. In a machine of the class described, the combination of a frame, an oscillatory support thereon, a pair of cooperating holding members one of which is pivoted to swing upon the support, a gear segment carried by the last mentioned holding member, a shaft having a worm for actuating said gear segment, a rack and pinion for advancing said shaft step by step, a lever upon the support for moving said rack, a cam upon the frame adapted to oscillate the lever upon movement of the support in one direction, means for oscillating the support and a tool carried by one of said holding members for cooperation with a work piece carried by the other.

19. In a machine of the class described, the combination of a frame, an oscillatory support thereon, a pair of cooperating holding members one of which is pivoted to swing upon the support, a gear segment carried by the last mentioned holding member, a shaft including opposed sections connected by a universal joint, means for rotating one of the sections, a pivoted bearing for the other section permitting it to swing about the center of said joint, a worm carried by the last mentioned section adapted to mesh with said gear segment, a releasable latch for holding the worm in operating position, means for oscillating the support and a tool carried by one of said holding members for cooperation with a work piece carried by the other.

20. In a machine of the class described, the combination of a frame, an oscillatory support thereon, a pair of cooperating holding members one of which is pivoted to swing upon the support, a gear segment carried by the last mentioned holding member, a swingingly mounted shaft having a worm adapted to be moved into and out of engagement with said gear segment, a locking pin adjustable to support said segment when the worm is disengaged therefrom, means for effecting a step by step movement of said shaft, means for oscillating said support and a tool carried by one of said holding members adapted for cooperation with a work piece carried by the other.

21. In a machine of the class described, the combination of a frame, an oscillatory support thereon, a pair of cooperating holding members one of which is pivoted to swing upon the support, a gear segment carried by the last mentioned holding member, a swingingly mounted shaft having a worm adapted to be moved into and out of operative relation with respect to said gear segment, a spring tending to move said shaft to release position, a latch for holding said shaft in operative position, cooperating means carried by said support and frame for effecting a step by step movement of the shaft, means for oscillating the support and a tool carried by one of said holding members for cooperation with a work piece carried by the other.

22. In a machine of the class described, the combination of a frame, an oscillatory support thereon, a slide adjustable upon the support, a pair of cooperating holding members one of which is pivoted to swing upon the slide, cooperating means for effecting a step by step movement of the last mentioned holding member including a shaft and an operating pinion carried by the slide, a rack slidably disposed in a slot formed in the support and having its teeth in mesh with the pinion, a series of rollers carried by the slide adjacent the pinion, a flexible band adapted to close said slot, said band extending around the pinion in engagement with the rollers and having its opposite ends secured to the support, cooperating means carried by the frame and support adapted upon movement of the latter in one direction to move said rack whereby to effect oscillation of said pinion and shaft, means for oscillating the support and a tool carried by one of said holding members for cooperation with a work piece carried by the other.

23. In a machine of the class described, the combination of a frame, an oscillatory support thereon, a pair of cooperating holding members one of which is carried by the frame and the other pivoted to swing upon the support, cooperating means upon the frame and support adapted upon movement of the latter to move said pivoted holding member relative to the support, a tool carried by one of said holding members for cooperation with a work piece carried by the other, a driven member operatively connected with the support, a driving member for said driven member, releasable means adapted when released to move said driving member to inoperative position, a latch for said releasable means and means for releasing the latch adapted to be operated by a part carried by said pivoted holding member when the latter is advanced to a predetermined position.

24. In a machine of the class described, the combination of a frame, an oscillatory support thereon, a pair of cooperating holding members one of which is carried by the frame and the other pivoted to swing upon the support, cooperating means upon the frame and support adapted upon movement of the latter to move said pivoted holding member relative to the support, a tool carried by one of said holding members for cooperation with a work piece carried by the other, a driven member operatively connected with the support, a driving member for said driven member and releasable means for moving said driving member to inoperative position, including a pivoted latch, a spring pressed latch bar therefor, a release rod connected with and movable relative to the bar and having a cam for releasing the latch, a hand control lever pivotally connected with the release rod and a member adapted to be operated by the lever for moving said driving member to inoperative position.

25. In a machine of the class described, the combination of a frame, an oscillatory support thereon, a pair of cooperating holding members one of which is carried by the frame and the other pivoted to swing upon the support, cooperating means upon the frame and support adapted upon movement of the latter to move said pivoted holding member relative to the support, a tool carried by one of said holding members for cooperation with a work piece carried by the other, a driven member operatively connected with the support, a driving member for said driven member, releasable means adapted when released to automatically move said driving member to inoperative position, said releasable means including a latch and a pair of relatively movable operating parts for shifting said driving member, one of said parts being spring-pressed and normally held against release by said latch and the other being manually movable to release said latch, and means for automatically releasing the latch adapted to be operated by a part carried by said pivoted holding member when the latter is advanced to a predetermined position.

26. In a machine of the class described, the combination of a frame, an oscillatory support thereon, a pair of cooperating holding members one of which is carried by the frame and the other pivoted to swing upon the support, cooperating means upon the frame and support adapted upon movement of the latter to move said pivoted holding member relative to the support, a tool carried by one of said holding members for cooperation with a work piece carried by the other, a driven member operatively connected with the support, a driving member for said driven member, releasable means adapted when released to automatically move said driving member to inoperative position, a latch for said releasable means, control means carried by the support for releasing the latch including a part normally in position to clear the latch during oscillation of the support but movable to effect release of the same when the support is moved to a predetermined position, and means adapted to be actuated by said pivoted holding member following completion of a work piece, said means being adapted to operate said control means whereby to move said part to latch releasing position.

27. In a machine of the class described, the combination of a frame, an oscillatory support thereon, a pair of cooperating holding members one of which is carried by the frame and the other pivoted to swing upon the support, cooperating means upon the frame and support adapted upon movement of the latter to move said pivoted holding member relative to the support, a tool carried by one of said holding members for cooperation with a work piece carried by the other, a driven member operatively connected with the support, a driving member for said driven member, releasable means adapted when released to automatically move said driving member to inoperative position, a latch for said releasable means, control means for said latch including a plunger adapted to swing with the support, a shaft upon the support having a pair of arms one of which is adapted to move the plunger to latch releasing position and the other to rock the shaft and a depressible member for the last mentioned arm adapted to be operated by said pivoted holding member following completion of a work piece.

JOSEPH J. McCABE.